(12) United States Patent
Chin et al.

(10) Patent No.: US 6,379,074 B1
(45) Date of Patent: Apr. 30, 2002

(54) COUPLER STRUCTURE FOR STEEL PIPE CONJOINMENT STABILIZATION

(76) Inventors: Hsueh-Hung Chin, No. 116, Ming Sheng Road, Tsau Tuan Town, Nan Tou Hsien; Philip Lo, No. 154, Guang Hua Road, Chang Hua City, both of (TW)

( * ) Notice: Subject to any disclaimer, the term of this patent is extended or adjusted under 35 U.S.C. 154(b) by 0 days.

(21) Appl. No.: 09/567,093

(22) Filed: May 8, 2000

(51) Int. Cl.[7] .................................................. F16B 9/02
(52) U.S. Cl. ........................ 403/231; 403/205; 403/171
(58) Field of Search ................................. 403/231, 230, 403/403, 205, 171, 176, 382; 312/265.4, 265.1; 248/188

(56) References Cited

U.S. PATENT DOCUMENTS

| | | | | |
|---|---|---|---|---|
| 2,669,497 A | * | 2/1954 | Bailey .......................... | 403/231 |
| 3,749,343 A | * | 7/1973 | Marschak .................... | 248/188 |
| 4,032,242 A | * | 6/1977 | Morris ......................... | 403/231 |
| 4,072,433 A | * | 2/1978 | Veyhl .......................... | 403/172 |
| 4,124,186 A | * | 11/1978 | Call, Sr. ....................... | 248/188 |
| 5,033,901 A | * | 7/1991 | Dias ............................ | 403/172 |
| 5,498,073 A | * | 3/1996 | Charbonneau et al. ... | 312/265.4 X |
| 5,655,821 A | * | 8/1997 | Laboch et al. ......... | 312/265.4 X |
| 5,695,263 A | * | 12/1997 | Simon et al. ............ | 403/231 X |
| 6,171,013 B1 | * | 1/2001 | Lee ............................. | 403/231 |

* cited by examiner

Primary Examiner—Harry C. Kim
(74) Attorney, Agent, or Firm—Troxell Law Office PLLC

(57) ABSTRACT

A coupler structure for steel pipe conjoinment that provides for user DIY assembly having a coupling block overlapping inner sides of two horizontal sections of steel piping, a bolt inserted through the coupling block to fasten together the two horizontal sections of steel piping, a locating hole formed in the ends of each inner side of the two horizontal sections of steel piping, and a threaded hold tapped at a suitable position in the front corner of a straight section of steel pipe. A junction contact element extends from each of the two ends of the coupling block with insertion tabs fitted into the locating hole in each of the two horizontal sections of the steel piping. A semi-circular opening is formed at the mutually facing ends of the two horizontal sections of the steel piping such that after the semi-circular openings are brought together, their position is in a state of alignment with the threaded hole of the straight section of steel pipe.

2 Claims, 8 Drawing Sheets

COUPLER STRUCTURE FOR STEEL PIPE CONJOINMENT STABILIZATION

BACKGROUND OF THE INVENTION

1). Field of the Invention

The invention herein relates to a coupler structure for steel pipe conjoinment stabilization comprised of a coupling block overlapping the inner sides of two horizontal sections of steel piping, a bolt inserted through the coupling block to fasten together the two horizontal sections of steel piping, a locating hole formed in the ends of each inner side of the two horizontal sections of steel piping, and a threaded hole tapped at a suitable position in the front corner of a straight section of steel pipe; the insertion tabs at the two sides of the coupling block are respectively slipped into the locating holes of the horizontal sections of steel piping such that the junction contact elements at the two sides of the coupling block are overlaid against the inner lateral ends of the two horizontal sections of steel piping, providing for the placement of the bolt to stably couple the horizontal sections of steel piping to the straight sections of steel piping; as such, DIY assembly by the user is conveniently facilitated and, furthermore, since the sections of steel piping can also be disassembled, this effectively reduces material shipping dimensions.

2). Description of the Prior Art

Conventional steel pipe coupling structures are typically sections of steel piping adhesively binding together straight steel pipes to construct a rigid steel pipe framework. However, since such types of adhesively coupled steel pipe frameworks must be fully assembled before purchase, the pleasure of DIY assembly cannot be provided to consumers and, furthermore, as the completely assembled steel pipe frameworks also have to be shipped prior to being purchased, the cost of their larger material shipping dimensions as well as their assembly are essentially passed on to the consumer, which constitutes a consumer burden.

In view of the said shortcomings, the inventor of the invention herein conducted research to develop the coupler structure for steel pipe conjoinment stabilization of the invention herein.

SUMMARY OF THE INVENTION

The primary objective of the invention herein is to provide a coupler structure for steel pipe conjoinment stabilization that is simple to assemble and in which the said coupling structure is comprised of a coupling block overlapping the inner sides of two horizontal sections of steel piping, a bolt inserted through the coupling block to fasten together the two horizontal sections of steel piping, a locating hole formed in the ends of each inner side of the two horizontal sections of steel piping, and a threaded hole tapped at a suitable position in the front corner of a straight section of steel pipe, wherein a junction contact element extends from each of the two ends of the said coupling block and, furthermore, the insertion tabs of the junction contact element are fitted into the locating hole in each of the two horizontal sections of the steel piping and, furthermore, there is a through-hole in the center anterior aspect of the coupling block; as such, the insertion tabs at the two sides of the junction coupling block are respectively fitted into the right angled locating holes of the two horizontal sections of the steel piping such that the junction contact elements at the two sides of the coupling block are overlaid against the inner lateral ends of the two horizontal sections of the steel piping, thereby providing for the placement of the bolt into the through-hole of the coupling block, which ensures the stable coupling together of the horizontal and straight sections of steel piping; as such, assembly is simple and convenient (facilitating DIY assembly by the user) and, furthermore, since the sections of steel piping can also be disassembled, this effectively reduces material shipping dimensions.

BRIEF DESCRIPTION OF THE INVENTION

DETAILED DESCRIPTION OF THE INVENTION

Figures 1, 1A, 1B:
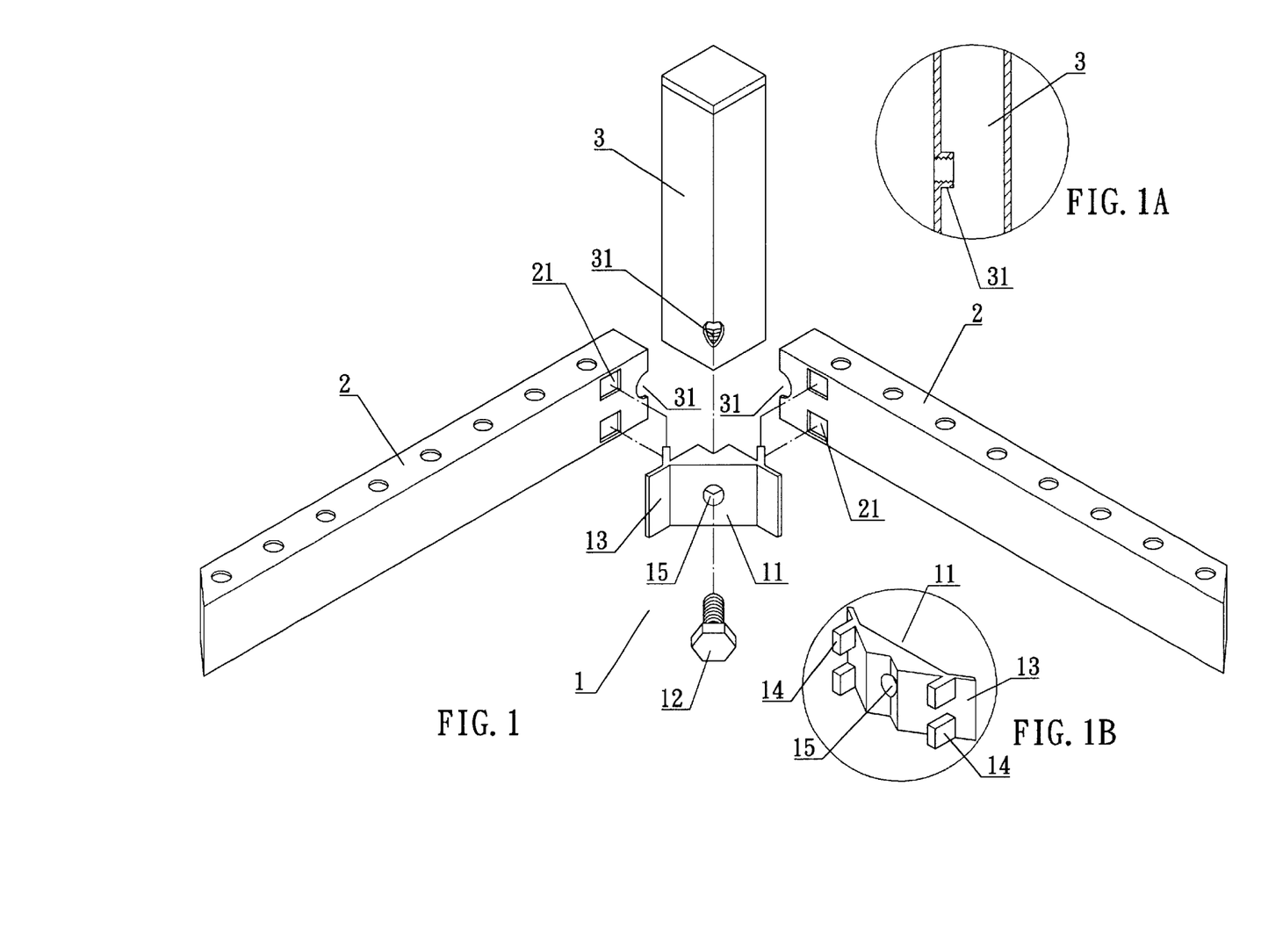
FIG. 1 is an exploded drawing of square steel piping and the coupler structure.
FIG. 1A is a partial, enlarged cross-sectional view of the square steel piping.
FIG. 1B is a rear perspective view of the coupling block of FIG. 1.
Figure 2:
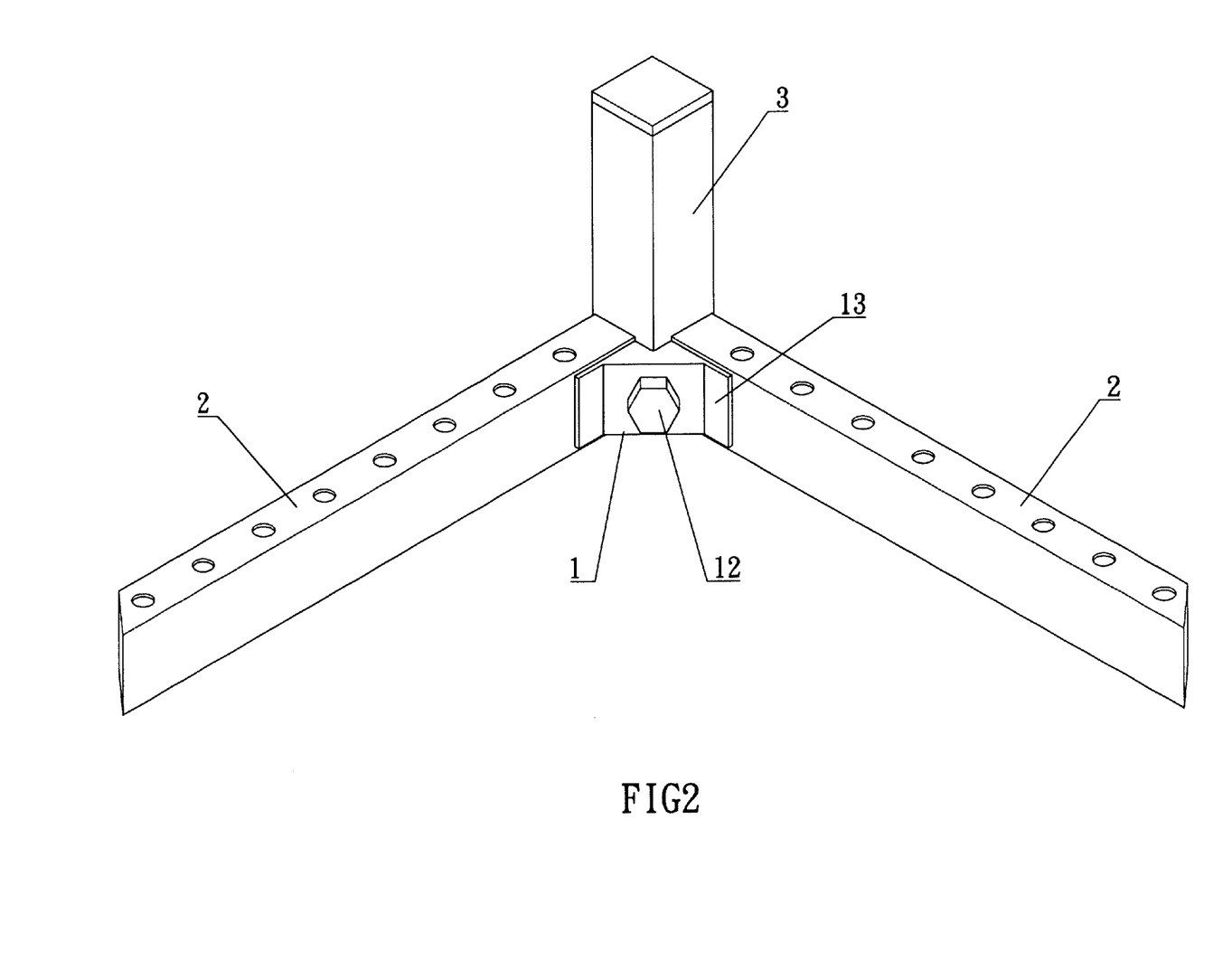
FIG. 2 is an isometric drawing of square steel piping conjoined by the coupler structure.

Referring to FIG. 1 and FIG. 2, the structure of the invention herein is easily understood, the said coupling structure 1 is comprised of a coupling block 11 overlapping the inner sides of two horizontal sections of steel piping and a bolt 12 inserted through the coupling block 11 to fasten together the two horizontal sections of steel piping 2, a locating hole 21 formed in the ends of each inner side of the two horizontal sections of steel piping 2, and a threaded hole 31 tapped at a suitable position in the front corner of a straight section of steel pipe 3, wherein:

A junction contact element 13 extends from each of the two ends of the said coupling block 11 and, furthermore, the insertion tabs 14 of the junction contact element 13 are fitted into the locating hole 21 in each of the two horizontal sections of the steel piping 2 and, furthermore, there is a through-hole 15 in the center anterior aspect of the coupling block 11.

Structurally, the said two horizontal sections of the steel piping 2 are hollow and, furthermore, each has an angled end 22, with a semi-circular opening 23 formed on each of the mutually facing remaining ends of the two horizontal sections of the steel piping 2 such that after the semi-circular openings 23 are brought together, their position is in a state of alignment with the threaded hole 31 of the straight section of steel pipe 3.

The insertion tabs 14 at the two sides of the junction contact element 13 are respectively fitted into the right angled locating holes 21 of the two horizontal sections of the steel piping 2 such that two sides of the insertion tabs 14 are flush against the interior sides of the two horizontal sections of the steel piping 2, thereby providing for the placement of the bolt 12 into the through-hole 15 of the coupling block 11 as well as the semi-circular openings 23 of the two horizontal sections of the steel piping 2 and its fastening thereafter into the threaded hole 31 of the straight section of steel pipe 3.

Figures 3, 3A, 3B:
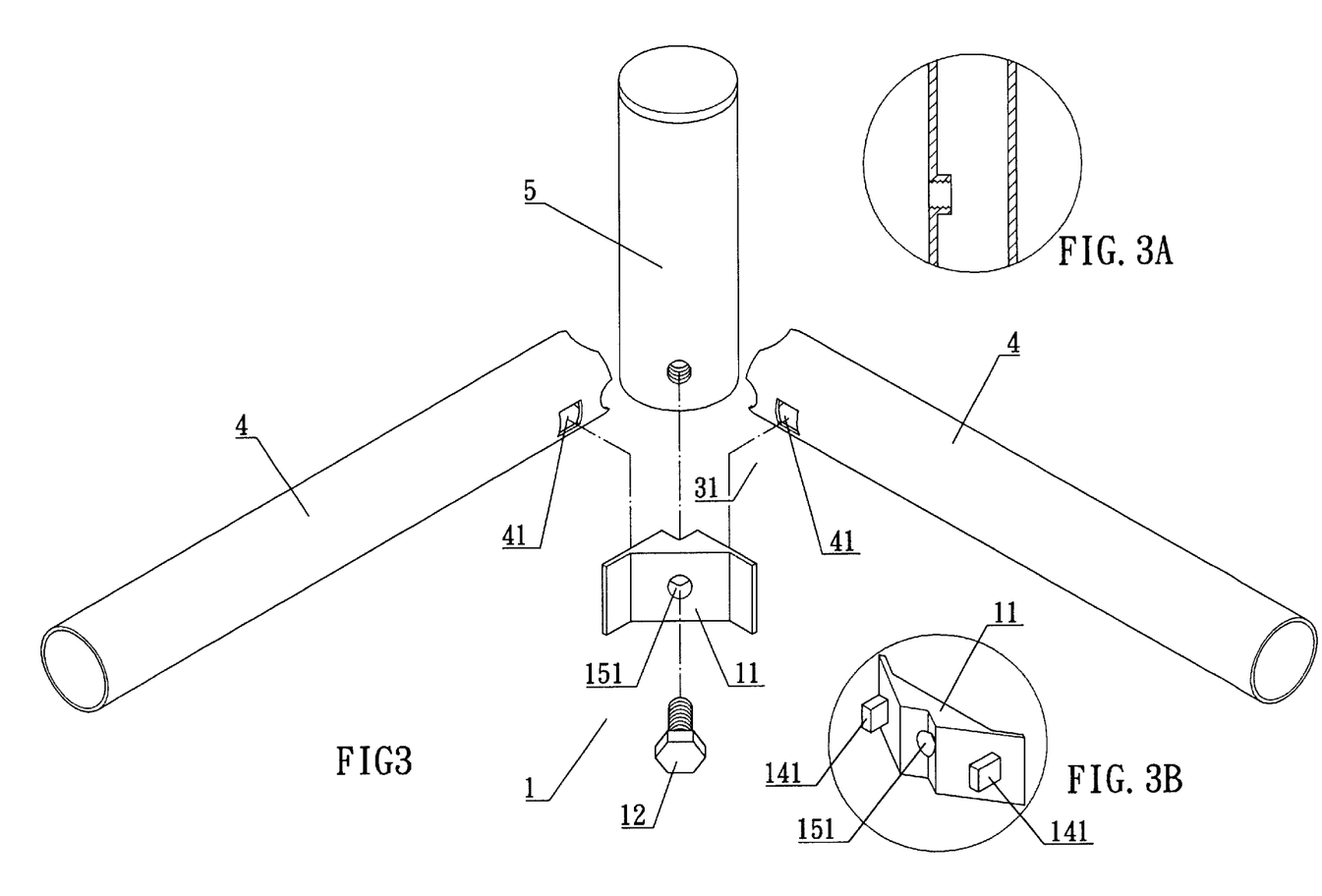
FIG. 3 is an exploded drawing of round steel piping and the coupler structure.
FIG. 3A is a partial, enlarged, cross-sectional view of the round steel piping.
FIG. 3B is a rear perspective view of the coupling block of FIG. 3.
Figure 4:
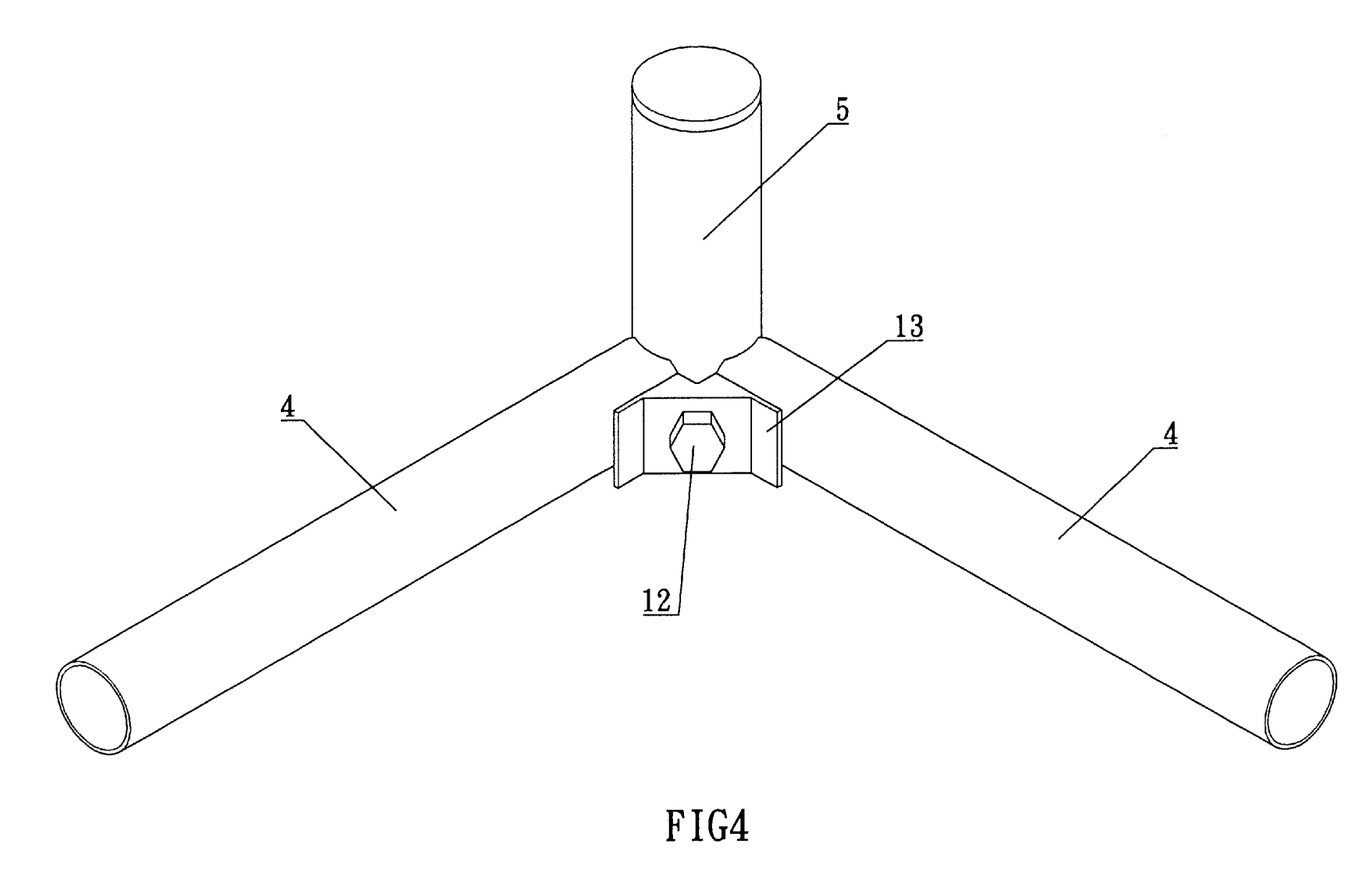
FIG. 4 is an isometric drawing of a round steel piping conjoined by the coupler structure.

Referring to FIG. 3 and FIG. 4, the embodiment of the coupling structure 1 for round steel piping, an insertion tab 141 is formed on each of the two ends of the said coupling block 11, a locating hole 41 aligned with the insertion tabs 141 is disposed on the inner sides of each end of the horizontal sections of round steel pipe 4 and, furthermore, there is a semi-circular opening 42 at each of the facing ends of the horizontal sections of round steel pipe 4 that are placed on a straight section of steel pipe 5 such that when the insertion tabs 141 are fitted into the locating holes 41, the threaded hole 51 tapped at a suitable position in the front end of the straight section of round steel tubing 5 is postured flush against the through-hole 151 in the center anterior aspect of the coupling block 11; as such, the arrangement provides for the respective sliding of the insertion tabs 141 of the coupling block 11 into the locating holes 41 of the two horizontal sections of round steel pipe 4 such that two sides of the insertion tabs 141 are flush against the interior sides of the two horizontal sections of the round steel piping 2 and then fastened together by the bolt 12.

Figures 5, 5A, 5B:
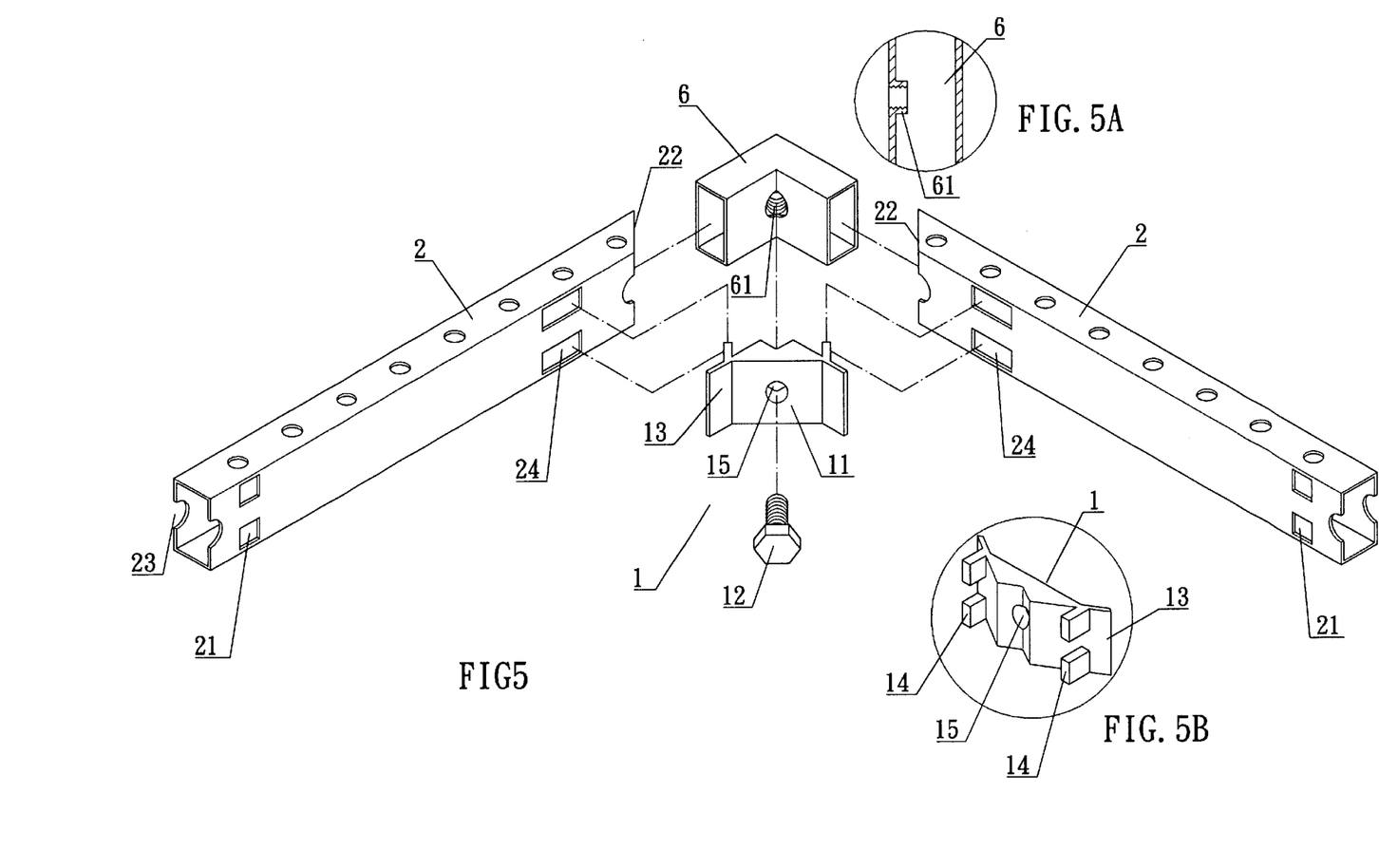
FIG. 5 is an exploded drawing of two square steel pipe sections in relative assembly positions.
FIG. 5A is a partial, enlarged, cross-sectional view of the joint pipe of FIG. 5.
FIG. 5B is a rear perspective view of the coupling block of FIG. 5.
Figure 6:
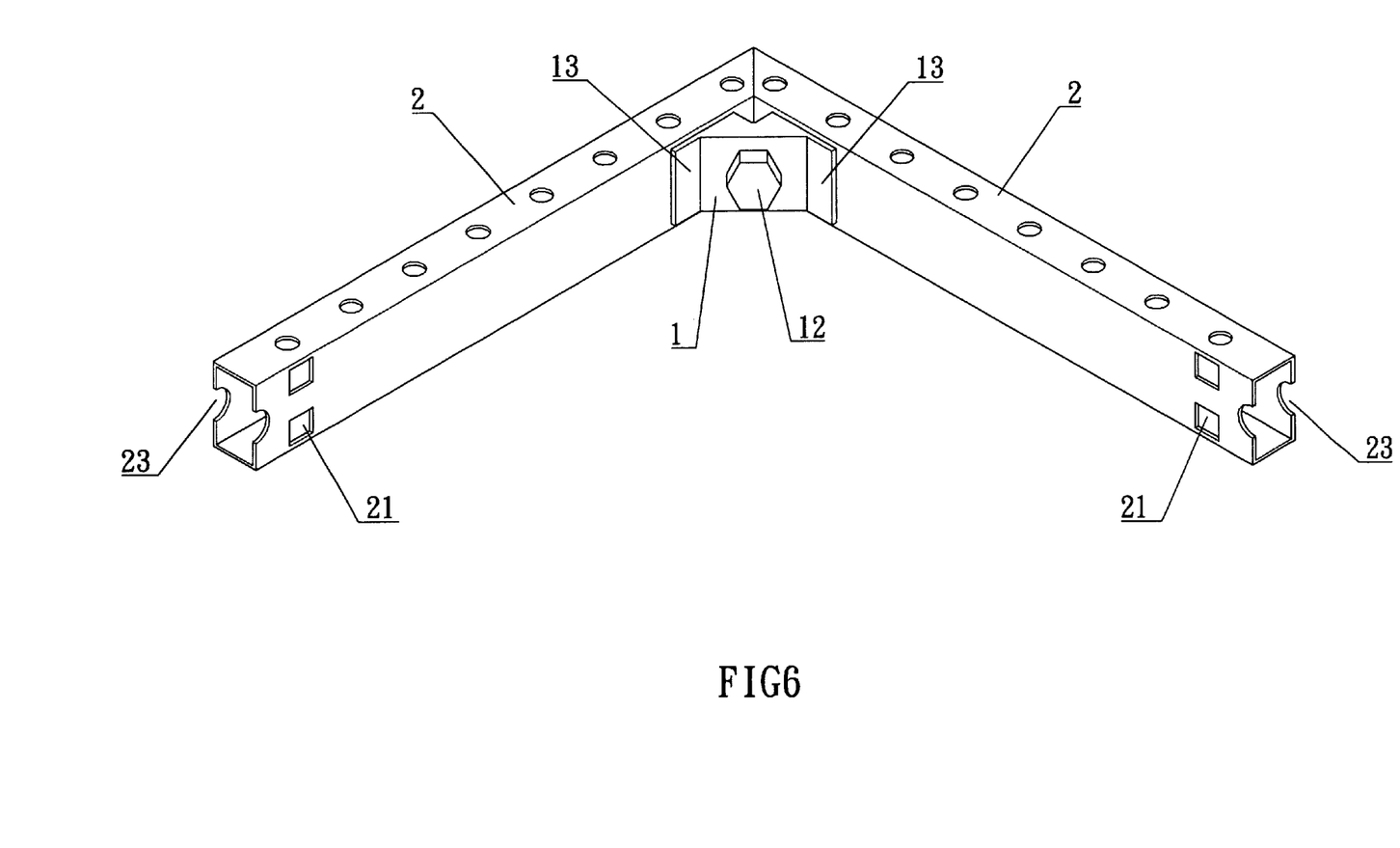
FIG. 6 is an isometric drawing of two square steel pipe sections in an assembled state.

Referring to FIG. 5 and FIG. 6, the embodiment in which the facing surfaces of the two sections of square steel piping 2 are angled, an L-shaped joint pipe 6 is additionally situated between the angled ends 22 of the said two sections of square steel piping 2 and, furthermore, a threaded hole 61 is tapped in the inward corner of the joint pipe 6, with each of the two ends accommodating the insertion of the angled ends 22, and a pair of locating holes 24 are formed in the angled ends 22 of the two sections of square steel piping 2 that provide for the sliding in of the insertion tabs 14 at the two sides of the coupling block 11 into the locating holes 24 of the steel piping and then fastened by the bolt 12.

Figure 7:
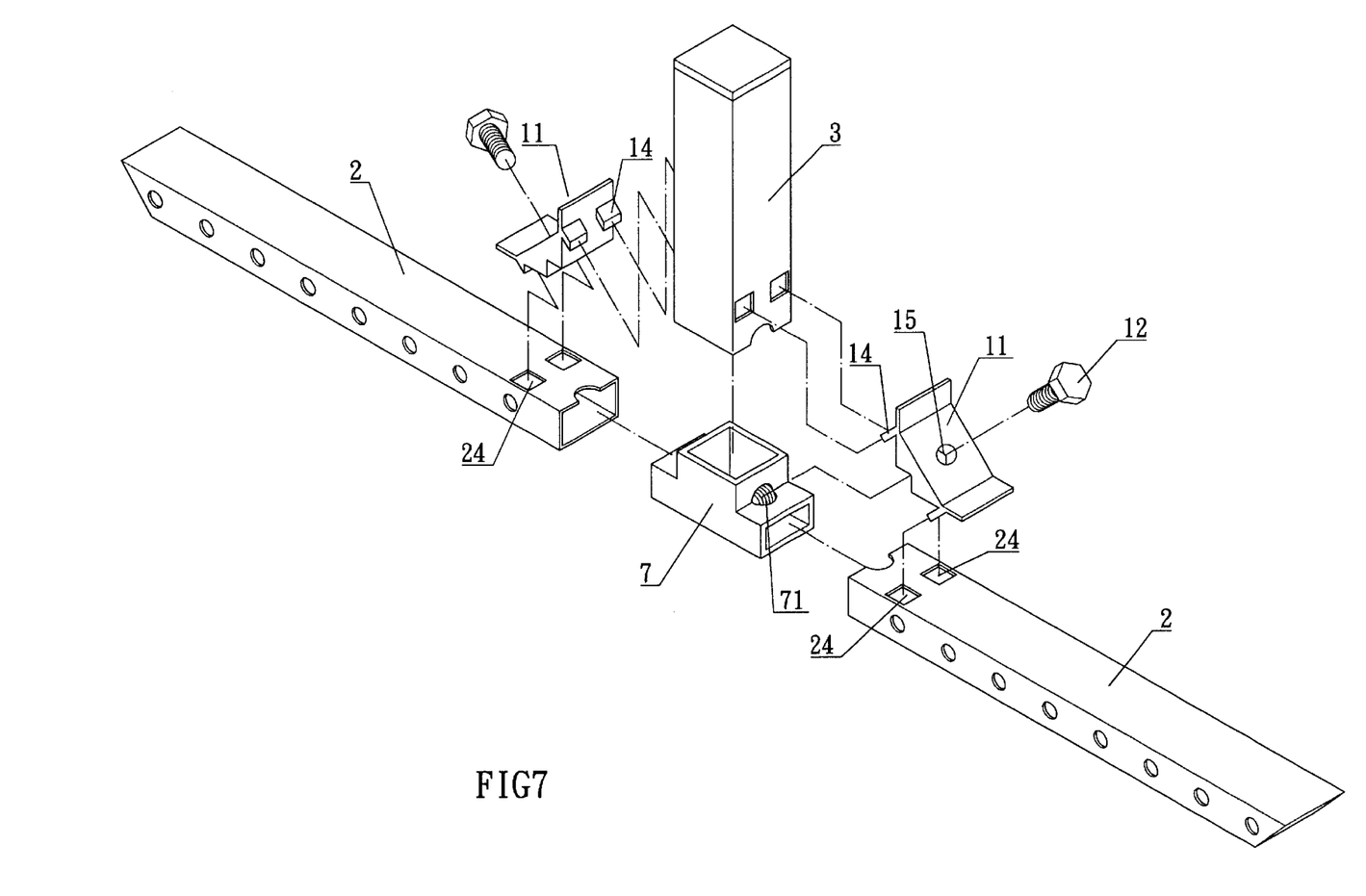
FIG. 7 is an exploded drawing of square steel pipe sections positioned in a T-shaped arrangement.
Figure 8:
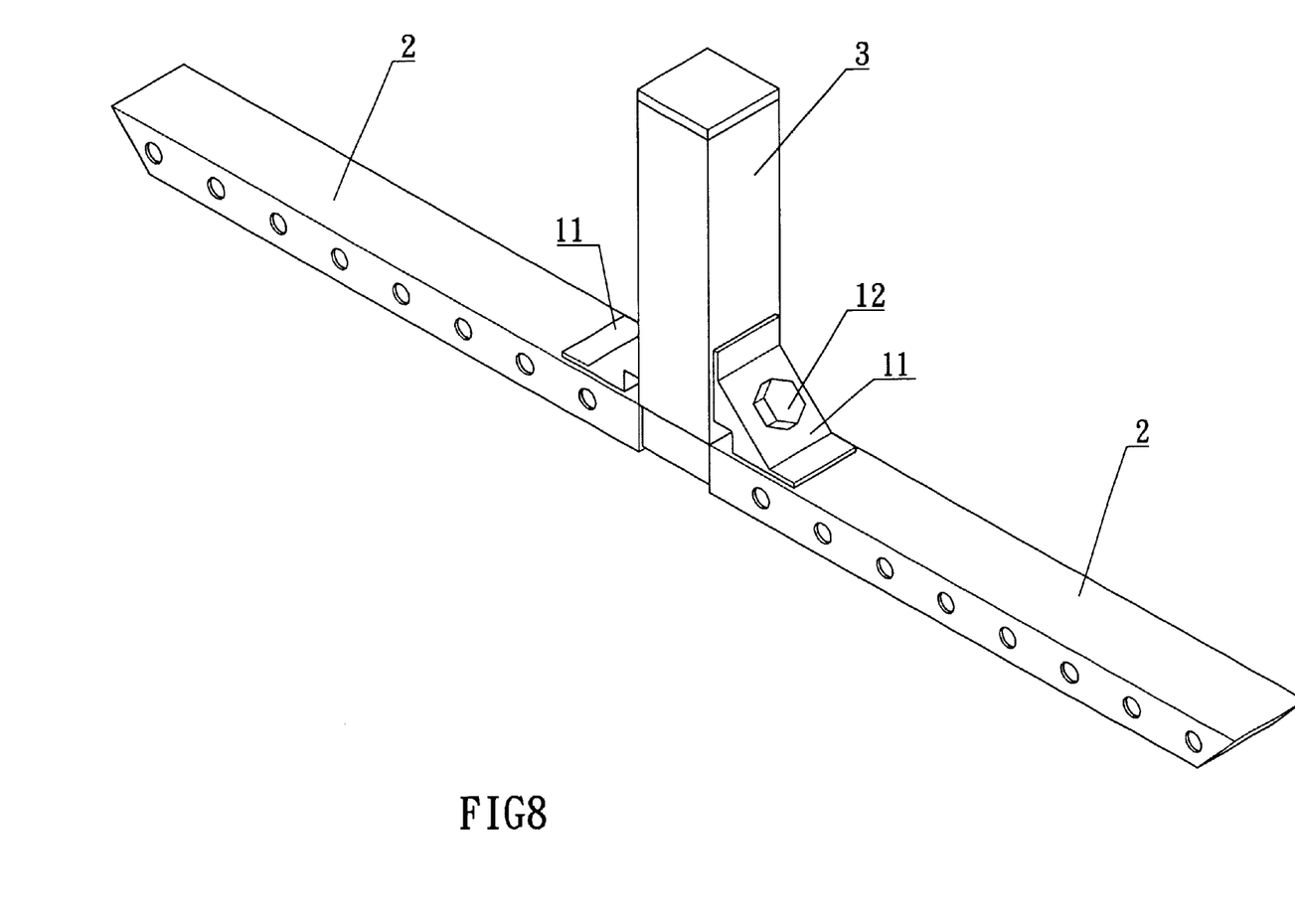
FIG. 8 is an isometric drawing of square steel pipe sections assembled in a T-shaped arrangement.

Referring to FIG. 7 and FIG. 8, in the T-shape coupling embodiment depicted, a T-shaped steel pipe 7 is situated between the two horizontal sections of steel piping 2 and, furthermore, a threaded hole 71 is tapped at each of inward corners at the two sides of the T-shaped steel pipe 7 and each of the two ends is inserted into the two horizontal sections of steel piping 2 and, furthermore, a pair of locating holes 24 is formed in each of the two horizontal sections of steel piping 2 which matches that formed in the straight steel pipe 3, thereby providing for the sliding in of the insertion tabs 14 at the two sides of the coupling block 11 into the locating holes 24 of the steel piping, and then a bolt 12 is placed into the through-hole 15 of the coupling block 11 and directly fastened into the threaded hole of the T-shaped steel pipe 7; as such, assembly is simple and convenient (facilitating DIY assembly by the user) and, furthermore, since the sections of steel piping can also be disassembled, this effectively reduces material shipping dimensions.

In summation of the foregoing section, the coupler structure for steel pipe conjoinment stabilization of the invention herein fully meets new patent application requirements and is lawfully submitted for review and the granting of the commensurate patent rights.

What is claimed is:

1. A coupler structure for steel pipe conjoinment comprising: a coupling block overlapping inner sides of two horizontal sections of steel piping; a bolt inserted through the coupling block to fasten together the said two horizontal sections of steel piping; a locating hole formed in the ends of each inner side of the two horizontal sections of steel piping; a threaded hole located in a front corner of a straight section of steel pipe; a junction contact element extending from each of two ends of the coupling block wherein insertion tabs of the junction contact element are fitted into the locating hole in each of the said two horizontal sections of steel piping; a through-hole in a center anterior position of the coupling block; and a semi-circular opening formed by mutually facing ends of the said two horizontal sections of the steel piping in alignment with the threaded hole in the said straight section of steel pipe, the bolt being placed into the through-hole of the coupling block and the semi-circular opening and inserted into the threaded hole of the said straight section of steel pipe; thereby facilitating do-it-yourself assembly and disassembly by a user.

2. The coupler structure of claim 1 wherein the insertion tabs are formed on each of two ends of the coupling block, the locating holes are aligned with the insertion tabs and, the semi-circular openings are located such that, when the insertion tabs are fitted into the locating holes, the threaded hole is postured flush against the through-hole in the center anterior portion of the coupling block; whereby the insertion tabs of the coupling block are slid into the locating holes and then fastened by the bolt.

* * * * *